(12) United States Patent
Le Clec'h et al.

(10) Patent No.: US 12,202,071 B2
(45) Date of Patent: Jan. 21, 2025

(54) METHOD AND APPARATUS FOR MANUFACTURING A WORKPIECE INTO A PRODUCT

(71) Applicant: SYNOVA S.A., Duillier (CH)

(72) Inventors: Julien Le Clec'h, Lausanne (CH); Jörg Pausch, Morges (CH); Bernold Richerzhagen, Saint-Sulpice (CH)

(73) Assignee: SYNOVA S.A., Duillier (CH)

( * ) Notice: Subject to any disclaimer, the term of this patent is extended or adjusted under 35 U.S.C. 154(b) by 607 days.

(21) Appl. No.: 17/435,734

(22) PCT Filed: Feb. 26, 2020

(86) PCT No.: PCT/EP2020/054970
§ 371 (c)(1),
(2) Date: Sep. 2, 2021

(87) PCT Pub. No.: WO2020/178090
PCT Pub. Date: Sep. 10, 2020

(65) Prior Publication Data
US 2022/0134477 A1    May 5, 2022

(30) Foreign Application Priority Data
Mar. 6, 2019  (EP) ..................................... 19161033

(51) Int. Cl.
  B23K 26/08    (2014.01)
  A44C 17/00    (2006.01)
  (Continued)

(52) U.S. Cl.
  CPC ........ B23K 26/0861 (2013.01); A44C 17/001 (2013.01); B23K 26/0823 (2013.01);
  (Continued)

(58) Field of Classification Search
  CPC .. B23K 26/402; B23K 26/38; B23K 26/0823; B23K 26/0861; B23K 26/146
  See application file for complete search history.

(56) References Cited

U.S. PATENT DOCUMENTS

| 6,405,562 B1 | 6/2002 | Zimet et al. |
| 2010/0000507 A1 | 1/2010 | Linares et al. |

(Continued)

FOREIGN PATENT DOCUMENTS

| DE | 39 23 356 C1 | 2/1991 | |
| DE | 102012003202 A1 * | 8/2013 | ............. B23K 26/08 |

(Continued)

OTHER PUBLICATIONS

International Search Report and Written Opinion issued in connection with the corresponding International Application No. PCT/EP2020/054970 on Jun. 12, 2020.

(Continued)

Primary Examiner — Thien S Tran
(74) Attorney, Agent, or Firm — The H.T. Than Law Group

(57) ABSTRACT

The invention relates to a method and an apparatus for manufacturing a workpiece, specifically a rough diamond, into a product, specifically a brilliant. The method is performed by an apparatus providing a laser beam coupled into a pressurized fluid jet. The method comprises executing multiple cuts of the workpiece with the laser beam according to a predetermined cut-sequence to remove workpiece material with each completed cut. The method further comprises executing multiple rotations of the workpiece around the same axis of revolution according to a predetermined rotation-sequence. Thereby, a rotation is executed after a completed cut, and for executing a cut the laser beam is moved along a two-dimensional path.

20 Claims, 12 Drawing Sheets

(51) Int. Cl.
  *B23K 26/146* (2014.01)
  *B23K 26/38* (2014.01)
  *B23K 26/402* (2014.01)
  *B23K 103/00* (2006.01)

(52) U.S. Cl.
  CPC ............ *B23K 26/146* (2015.10); *B23K 26/38* (2013.01); *B23K 26/402* (2013.01); *B23K 2103/50* (2018.08)

(56) References Cited

U.S. PATENT DOCUMENTS

| | | | |
|---|---|---|---|
| 2010/0059034 A1 | 3/2010 | Linares et al. | |
| 2015/0165549 A1* | 6/2015 | Beutler | B23K 26/032 219/121.83 |
| 2015/0165553 A1 | 6/2015 | Gaebelein et al. | |
| 2017/0072511 A1* | 3/2017 | DiGiovanni | B24D 18/00 |
| 2018/0271234 A1* | 9/2018 | Monachon | B23K 26/38 |
| 2020/0139484 A1 | 5/2020 | Okuma | |

FOREIGN PATENT DOCUMENTS

| | | | |
|---|---|---|---|
| EP | 3437799 A1 * | 2/2019 | |
| JP | 2005073719 A * | 3/2005 | |
| JP | 2006256730 A | 9/2006 | |
| JP | 2012024781 A | 2/2012 | |
| JP | 2012086903 A | 5/2012 | |

OTHER PUBLICATIONS

Machine translation of DE DE3923356 to Maho AG.
Machine translation of DE 10 2012 003202 to Vollmer Werke Mascf.
Indian Examination Report issued in connection with the corresponding Indian Patent Application No. 202117039011 on Feb. 8, 2023.
Machine translation of DE 10 2012 003 202 A1 to Vollmer Werke Maschinenfabrik GmbH.
Machine translation of JP 2012024781 A to Amada Co LTD.
Machine translation of JP 2005073719 A to Tokyo Pearl.
Japanese Office Action issued in connection with the corresponding Japanese Patent Application No. 2021-552140 issued on Dec. 12, 2022 and its English translation.
Machine translation of JP 2012086903 to Fuji Seal Int Inc.
Machine translation of JP 2006256730 to Matsushita Electric Works Ltd.
Canadian Office Action issued in connection with the corresponding Canadian Patent Application No. 3,129,683 on Feb. 12, 2024.
Korean Office Action issued in connection with the corresponding Korean Patent Application No. 10-2021-7027808 on Apr. 12, 2024.

* cited by examiner

METHOD AND APPARATUS FOR MANUFACTURING A WORKPIECE INTO A PRODUCT

TECHNICAL FIELD

The present invention relates to a method and an apparatus for manufacturing a workpiece, specifically a rough diamond or other ultra-hard material, into a product, specifically a brilliant or other facetted gem. The method uses the apparatus, and the apparatus is configured to provide a laser beam that is coupled into a pressurized fluid jet. The laser beam is used to cut the workpiece multiple times to shape the product. The product can be manufactured full-automatically from the workpiece.

BACKGROUND

Shaping workpieces made from ultra-hard materials—like from diamond (naturel) and/or artificial diamond—into a product with a desired complex shape is very challenging. In particular, when a high shaping accuracy is needed. For instance, (rough) diamonds are typically manufactured into complex shapes including "round" "brilliant", "emerald", "pear", or "princess". These complex shapes have multiple facets, which have to be cut with a very high accuracy.

A conventional way of manufacturing, for instance, a rough diamond into a brilliant (or into any other facetted gem) includes cutting (e.g. cleaving, sawing and/or bruiting) and polishing. Especially the cutting and polishing are often carried out manually. Thereby, a first set of facets is typically produced initially, and the facets are subsequently checked and compared to the initial planning. Afterwards, the first set of facets may be corrected, and possibly a re-planning has to be carried out. Next, a second set of facets is produced, wherein the produced facets are likewise checked and optionally corrected. It can be easily understood that in this way a complete manufacturing process, e.g. of shaping a rough diamond into a brilliant with all of its facets, is very time consuming. Furthermore, the quality of the facets has to be checked rather often.

Of course it has also been considered to support the above-described process by the use of conventional machine cutting and polishing techniques. For instance, special saws or laser tools have been proposed for shaping e.g. a diamond into a facetted. However, even with such machine techniques, it is not possible to shape the diamond into the gem completely without human intervention, and without any intermediate checks and possibly re-planning of the product. Thus, even when employing such machine techniques, the overall process times are still much too high.

Therefore, embodiments of the invention aim at improving the conventional way for manufacturing a workpiece, particularly an ultra-hard workpiece like a diamond, into a product, particularly into a facetted gem like a brilliant. An objective is in particular to provide a method and apparatus, which are able to manufacture the product full-automatically from the workpiece without any human interaction. The overall process times for completing the product should be significantly reduced. In addition, the product should be manufactured with a very high precision. No intermediate checks and/or re-planning of the product should be necessary during the shaping process.

The above goals should particularly be achievable for all kinds of materials, in particular also for new alloy materials, and for hard and/or brittle materials. However, a main focus of the embodiments of the invention is the automatic shaping of a diamond into a brilliant or other facetted gem. In this respect, no solution for a full-automatic process exists up to now.

SUMMARY OF THE INVENTION

The objective is achieved by the embodiments presented in the enclosed independent claims. Advantageous implementations of these embodiments are defined in the dependent claims.

In particular, the embodiments of the invention base generally on the use of an apparatus for implementing a method, wherein the apparatus provides a laser beam that is guided in a fluid jet by internal reflection. This fluid-jet guided laser beam can efficiently cut a workpiece, even ultra-hard workpiece materials like a diamond, with a very high precision. The method bases further on a scheme of successively cutting pieces from the workpiece with the laser beam, i.e. slicing of volume of material from the workpiece, and rotating the workpiece, in order to create the desired complex shape of the product. The total volume of the workpiece may, for example, be between 1 mm$^3$ and 20000 mm$^3$.

A particular challenge for such the method according to an embodiment of the invention, i.e. using an apparatus providing a fluid-jet guided laser beam, is to ensure that the apparatus to work rapidly and full-automatically without human interaction. This requires executing very precise cuts and moreover determining quickly and accurately if and when a cut has been completed. A further challenge is to find a cutting strategy, e.g. for a brilliant to determine which facets to cut in which order and under which cutting angle, in order to ensure at the same time a high surface quality of the cuts, efficient process times, and a constant and stable cutting. In particular, the presence of the fluid jet also needs to be taken into account.

A first aspect of the invention provides a method for manufacturing a workpiece into a product, wherein the method is performed by an apparatus providing a laser beam coupled into a pressurized fluid jet, the method comprising: executing multiple cuts of the workpiece with the laser beam according to a predetermined cut-sequence to remove workpiece material with each completed cut, executing multiple rotations of the workpiece around the same axis of revolution according to a predetermined rotation-sequence, wherein a rotation is executed after a completed cut, and wherein for executing a cut the laser beam is moved along a two-dimensional path.

The product may be planned in a conventional planning tool and/or software, and data related to the shape of the final product may be extracted and transformed into machine code, which is readable by the apparatus. This pre-planning may result in the pre-determined cut-sequence and the predetermined rotation-sequence, respectively, which are used as an input in the method of the first aspect, particularly are fed into the apparatus.

With the method of the first aspect, the product can be completely shaped from the workpiece by executing, without human interaction, the cuts and rotations according to the cut- and rotation sequences. Due to the fact that there is only one axis of rotation, and since the laser beam is moved only along a two-dimensional path for executing each cut, the method can be carried out very fast and precisely. That means, the product can be shaped with a high quality in a very time saving manner. Human interaction is not necessary, because no intermediate quality checks have to be made and no re-planning has to be done.

Notably, a cut relates to an instruction in the cutting sequence and determines a piece of material to be sliced off from the workpiece by moving the laser beam along the two-dimensional path. A cut is completed ("completed cut") when said piece of material is sliced off completely, i.e. is separated from the rest of the workpiece. Until a cut is completed, it can be executed one or more times ("executed cut"), i.e. the movement of the laser beam along the two-dimensional path for this cut may be repeated.

A high cutting accuracy is achieved especially by means of the fluid-guided laser beam, and the workpiece can consequently be shaped into the product more or less perfectly as planned. The method further allows optimization with respect to the removed material. For instance, the removed material may be used for creating additional products, e.g. B-Stones or C-Stones in case a brilliant (A-Stone) is shaped from a rough diamond.

In an implementation form of the method, the manufactured product can be larger, e.g. 20 µm-100 µm larger, than a desired product. This allows, for instance, for further polishing or correction of the product. For example, the laser beam may graphitize some workpiece materials, which may be removed, e.g. by shot blaster, sanding, conventional polishing, or the like.

In an implementation form of the method, one rotation by an angle determined from the predetermined rotation-sequence is executed after each completed cut, and the laser beam is moved once along a two-dimensional path determined from the predetermined cut-sequence for executing a cut.

In this way, the method can be carried out very quickly and precisely. The fluid-jet guided laser beam enables efficient cutting even in this manner.

In an implementation form of the method, the two-dimensional shape includes a straight and/or an arc.

That is, the fluid-jet guided laser beam is moved into one or two dimensions. The two-dimensional movement of the fluid-jet guided laser beam can be carried out quickly and precisely by the apparatus, e.g. by means of a Computerized Numerical Control (CNC).

In an implementation form, the method further comprises: determining after each executed cut, with an optical sensor of the apparatus, whether the cut was completed or not.

The use of the sensor, and particularly its ability to determine a completed cut, allows manufacturing the product in a fully-automated and rapid manner. For instance, it is thereby possible to execute a cut one or more times, until the sensor sends a signal that the cut is completed. The sensor can be supported by processing circuitry, e.g. a control unit of the apparatus. The control unit can, for example, evaluate the signal of the sensor for patterns that indicated that a cut is completed or not completed.

In an implementation form, the method further comprises: rotating the workpiece, particularly rotating the workpiece by 180°, and then executing the same cut again, if determining that the cut was completed, and executing the next cut according to the predetermined cut-sequence, if further determining that also the same executed cut after rotating the workpiece was completed.

This corrective action (in the following referred to as "180° corrective action", although other angles than the preferred 180° are also possible) ensures that the cut is actually completed, if the sensor has determined that. This significantly improves the reliability and stability of the method.

The sensor may, for example, be a sensor that is configured to measure electromagnetic radiation (emission) from the workpiece surface, which may for instance be induced (secondary emission) when cutting the workpiece, or may be laser light reflected from the workpiece. Based on an emission pattern in this radiation, it is possible to determine from the sensor signal, e.g. by the sensor itself or by a control unit including processing circuitry, whether a cut is indeed completed or not. In fact, the optical sensor and/or control unit may be configured to determine each of the following conditions: an executed cut was completed; an executed cut was not completed; no workpiece material was removed at all by executing a cut. Because of the ability to determine these conditions, the product can be shaped automatically and quickly.

If the workpiece is a rough diamond, it could potentially happen that (due to inclusions, porosity, impurity, etc.) the cutting process stops, due to a false detection of a completed cut. Thus, implementing the 180° corrective action as checking mechanism is especially useful when cutting a rough diamond.

In an implementation form, the method further comprises: moving, if determining that the cut was completed, the fluid jet away from the workpiece to a determined position where material should have been removed from the workpiece by completing the cut, turning on the laser beam at the determined position, and determining, with the optical sensor, whether there is workpiece material at the determined position or not.

This provides an alternative checking mechanism to the 180° corrective action, which can also be used to check the correctness of the determination with/or the optical sensor that the cut was completed. The fluid-jet is particularly moved (preferably with laser beam off) to the area where the piece of material should have fallen off, and the laser beam is turned on to see with the optical sensor, if material or void is at that position.

In an implementation form, the method further comprises: executing the same cut again one or multiple times without rotating the workpiece, if determining that the cut was not completed, until determining that the cut was completed.

In this way, the cut can be quickly repeated (same two-dimensional path is followed, not necessarily in the same direction) multiple times until completed.

In an implementation form of the method, the workpiece is a rough diamond, the product is a brilliant comprising a plurality of facets, and each particular facet of the plurality of facets is produced by executing a cut one or multiple times until the cut is completed.

The term "brilliant" includes facetted gems like a "round" "emerald", "pear", or "princess". The fluid-jet guided laser beam cutting with support of the optical sensor is particularly advantageous to manufacture automatically all facets of the diamond with short process times. In the following, advantageous cutting strategies, particularly designed for shaping a rough diamond with a fluid-jet guided laser beam into a brilliant are proposed.

In an implementation form of the method, for producing the particular facet, the laser beam is always moved along the length of the facet to execute the cut.

This is referred to in this document as "side-on" cutting strategy. Moving "along the length of the facet" means a moving along the longer side of the facet. That is, towards and/or away from an apex of the facet, particularly moving in a direction connecting apex and base of a typical triangular facet. The side-on cutting strategy allows for the above-described 180° corrective action. Furthermore, with this cutting strategy, it is possible to recover large parts of diamond material when cutting the facets. These large parts can potentially be used to manufacture further facetted gems from the rough diamond material. This cutting strategy also yields very short process times.

In an implementation form of the method, the axis of revolution is perpendicular to the pressurized fluid jet and the laser beam.

In this implementation form, rotating round the axis of revolution in combination with moving the laser beam along two directions (e.g. x-y-directions in an x-y-z coordinate system, wherein the z-direction is parallel to the fluid jet) is enough for creating all facets of a brilliant.

In an implementation form of the method, the rough diamond is attached with its table to a rotatable part of the apparatus, and the axis of revolution is perpendicular to the surface of the table.

In this way, the rough diamond can be precisely attached to the apparatus, in order to achieve precisely cut facets. The rotatable part of the apparatus may be a so-called "Dop". The rotatable part may be at least 10% smaller, particularly at least 20% smaller (in diameter/width), than the table of the rough diamond. This allows the best cutting performance for bezel facets and star facets of the brilliant.

The table may be pre-cut into the rough diamond. The table is preferably polished, before fixation on the apparatus. The table may, however, be just cut with a dedicated allowance. The table fixing leads to an improved quality of the brilliant, because angular mistakes when cutting the diamond will be reduced, and since angular mistake may lead to a deviation from the planed brilliant. Angular deviation from the axis of revolution to the surface of the table, is not larger than 1°, preferably not larger than 0.5°, more particularly not larger than 0.1°.

In an implementation form of the method, for producing the particular facet, the laser beam is always moved along the width of the facet to execute the cut.

This is referred to in this document as "end-on" cutting strategy. Moving "along the width of the facet" means moving along the shorter side of the facet. That is, neither towards nor away from the apex of the facet, but across a typical triangular facet of a brilliant.

The diamond may be oriented such that a culet faces upwards, i.e. the culet is oriented in direction of the apparatus providing the fluid-jet coupled laser beam. In this document, this is referred to as "culet-up" cutting strategy, and is advantageously compatible with attaching the diamond via a table to the apparatus. The diamond may also be oriented such that its table faces upwards, i.e. the table is oriented in direction of the apparatus providing the fluid jet coupled laser beam. In this document, this is referred to as "table-up" cutting strategy, and has the advantage that the facets can be attacked from their thicker part and/or can be attacked with a cutting angle >20°. This leads to a higher cutting reliability.

In an implementation form of the method, the axis of revolution is non-perpendicular to the pressurized fluid jet and the laser beam.

That is, the diamond may be mounted such that the axis of revolution is arranged in a certain angle with respect to the fluid jet and laser beam, respectively. For example, the angle between the axis of revolution and the laser beam direction may be identical to the angle between the axis of revolution and the facet currently being cut. This angle is then determined by the brilliant geometry (usually 42.25° for the pavilion facets, and 34.5° for the crown facets). In this case, rotating around the axis of revolution and moving the laser along one direction (e.g. x-direction or y-direction in an x-y-z coordinate system, wherein the z-direction is parallel to the fluid jet) is enough to fabricate all facets of the brilliant.

In an implementation form of the method, for producing the particular facet: the laser beam is moved along the two-dimensional path back and forth, in order to execute the cut multiple times.

In this document, this is referred to as "back-and-forth" cutting strategy. With this cutting strategy, the cutting time can be reduced.

In an implementation form of the method, for producing the particular facet: the laser beam is moved along the two-dimensional path always in the same direction, in order to execute the cut multiple times.

This is generally referred to in this document as "one-direction" cutting strategy. With this cutting strategy, the above-described 180° rotation corrective action is advantageously possible.

In an implementation form of the method, for producing the particular facet: the laser beam is always moved towards the apex of the facet to execute the cut, or the laser beam is always moved away from the apex of the facet to execute the cut.

These are specifications of the "one-direction" cutting strategy and are referred to in this document as "downhill" and "uphill" cutting strategy, respectively. The former cutting strategy provides a more efficient cutting process. Moreover, the cutting process is less sensitive to instabilities of the fluid jet. The latter cutting strategy allows attacking the facet from its thicker side, thus making the cutting more reliable.

In an implementation form of the method, for producing the particular facet, the laser beam is positioned on a previously produced facet to execute the cut.

This is referred to in this document as "grouped fresh" cutting strategy, since determined groups of facets are cut after another. Advantageously, the above-described 180° corrective action is possible. Furthermore, an advantage is that each new cut starts always on a freshly (previously) cut surface/facet of the diamond/brilliant, which leads to a higher quality particularly in combination with the use of a fluid-jet guided laser beam.

In an implementation form of the method, for producing the particular facet: the laser beam is positioned on an uncut surface of the rough diamond to execute the cut.

This is referred to in this document as "grouped rough" cutting strategy, since determined groups of facets are cut after another. Advantageously, the above-described 180° corrective action is possible. Furthermore, an advantages is that the rough diamond can be attacked from the inside of the acute angle of a slice to be removed (i.e. from the thick part of slice to be removed) for producing a typical triangular facet of a brilliant.

In an implementation form of the method, the plurality of facets is produced according to an order of appearance.

Advantageously, at first the "biggest" nails may be removed from the rough diamond, in order to allow reuse for cutting other stones.

In an implementation form of the method, pavilion facets are produced before lower girdle facets, and preferably girdle facets, then bezel facets, then upper girdle facets, then star facets are further produced.

This cutting order optimizes the cutting time when using the apparatus of this invention. Producing the pavilion before the bezel facets is particularly beneficial when using a fluid-jet guided laser beam.

In an implementation form of the method, a first group of discontiguous girdle facets, particularly left lower girdle facets or right lower girdle facets, is produced before a second group of discontiguous lower girdle facets, particularly right lower girdle facets or left lower girdle facets, respectively, is produced.

This grouping is suitable for the above-mentioned "grouped fresh" and "grouped rough" cutting strategies. It beneficially orientates the rough diamond such that for the lower girdle facets, the largest cutting angle is offered to the laser beam. Thus, the cutting reliability is increased.

In an implementation form of the method, before creating a lower girdle facet and/or an upper girdle facet, the rough diamond is rotated such that the cut is executed from the side offering the larger cutting angle.

Thus, lower angle cuts are avoided. This is particularly beneficial in combination with the use of a fluid-jet guided laser beam. For example, on the bottom side/lower part of the brilliant (the pavilion), there are two types of facets (pavilion facets and lower girdle facets). They are placed either at 22.5° or 11.25° form each other. The facet processing is beneficially ordered to allow 22.5° cuts rather than 11.25° cuts.

In an implementation form of the method, the brilliant has a size of 0.1 ct to 100 ct, in particular has a size of 0.2 ct to 5 ct.

In an implementation form of the method, a speed of removing material from the rough diamond by executing and completing cuts is 0.8 ct to 2.5 ct/h.

These are the optimum sizes and cutting speeds to avoid, on the one hand, machine constraints or fixation constrains, and on the other hand, an overly difficult quality control, due to a high material volume.

In an implementation form of the method, 57 facets of the brilliant are created by automatically cutting the rough diamond according to the cut-sequence and the rotation-sequence using the fluid-jet guided laser beam and the optical sensor of the apparatus.

The stone can thus be shaped rather quickly and in a full-automatic manner with the aid of the optical sensor. This becomes possible by advantageously combining a fluid-jet guided laser beam, an optical sensor and/or control unit, and the selection of the cutting strategy—as described in this invention.

Beneficially, a rough diamond can be manufactures into a brilliant in a time below 8 hours, particularly below 5 hours, for a size of 1 ct to 5 ct. The shaping process of a product can even be only 30 min to 4 hours (for smaller sizes). With the method of the first aspect, up to 1000 facets could be shaped without human intervention in a precise manner.

Notably, after performing the method of the first aspect, the product, particularly the brilliant, may be further polished, or finished, or smoothened, or the like, in a traditional way.

A second aspect of the invention provides an apparatus for manufacturing a workpiece into a product, the apparatus comprising: a machining unit configured to provide a laser beam coupled into a pressurized fluid jet, a control unit configured to control the machining unit to: execute multiple cuts of the workpiece with the laser beam according to a predetermined cut-sequence to remove workpiece material with each completed cut, execute multiple rotations of the workpiece around the same axis of revolution according to a predetermined rotation-sequence, wherein a rotation is executed after a completed cut, and wherein the laser beam is moved for executing a cut along a two-dimensional path, and an optical sensor configured to determine at least each of the following conditions: an executed cut was completed; an executed cut was not completed.

To determine a condition, the optical sensor may provide a signal to the control unit, which evaluates the signal and accordingly outputs a determination result. However, the optical sensor may already provide the determination result. The optical sensor may additionally be configured to determine the conditions: no workpiece material was removed at all by executing a cut.

The apparatus of the second aspect advantageously combines the fluid-jet guided laser beam, optical sensor, and rotational means for attaching the workpiece, so as to be able to full-automatically manufacture the product. The apparatus is particularly designed for manufacturing a brilliant or other facetted gem from a rough diamond. The apparatus can execute any of the above-described cutting strategies based on the predetermined cut- and rotation sequences.

The apparatus according to the second aspect can be implemented according to implementations forms described with respect to the method of the first aspect. For example, the apparatus can follow the various cutting strategies and can shape a complete brilliant from a diamond. The apparatus thus enjoys all advantages described above for the first aspect.

A third aspect of the invention provides a computer program (or a computer program product), which comprises a program code for performing the method according to the first aspect or any implementation thereof when executed on a computer, and/or for controlling the apparatus according to the second aspect.

A fourth aspect of the invention provides a non-transitory storage medium storing executable program code which, when executed by a processor, causes the method according to the first aspect or any implementation thereof to be performed.

BRIEF DESCRIPTION OF DRAWINGS

The above-described aspects and implementation forms defining general embodiments according to the invention are explained in the following description of specific embodiments in relation to the enclosed drawings, in which.

DETAILED DESCRIPTION OF EMBODIMENTS

Figure 1:
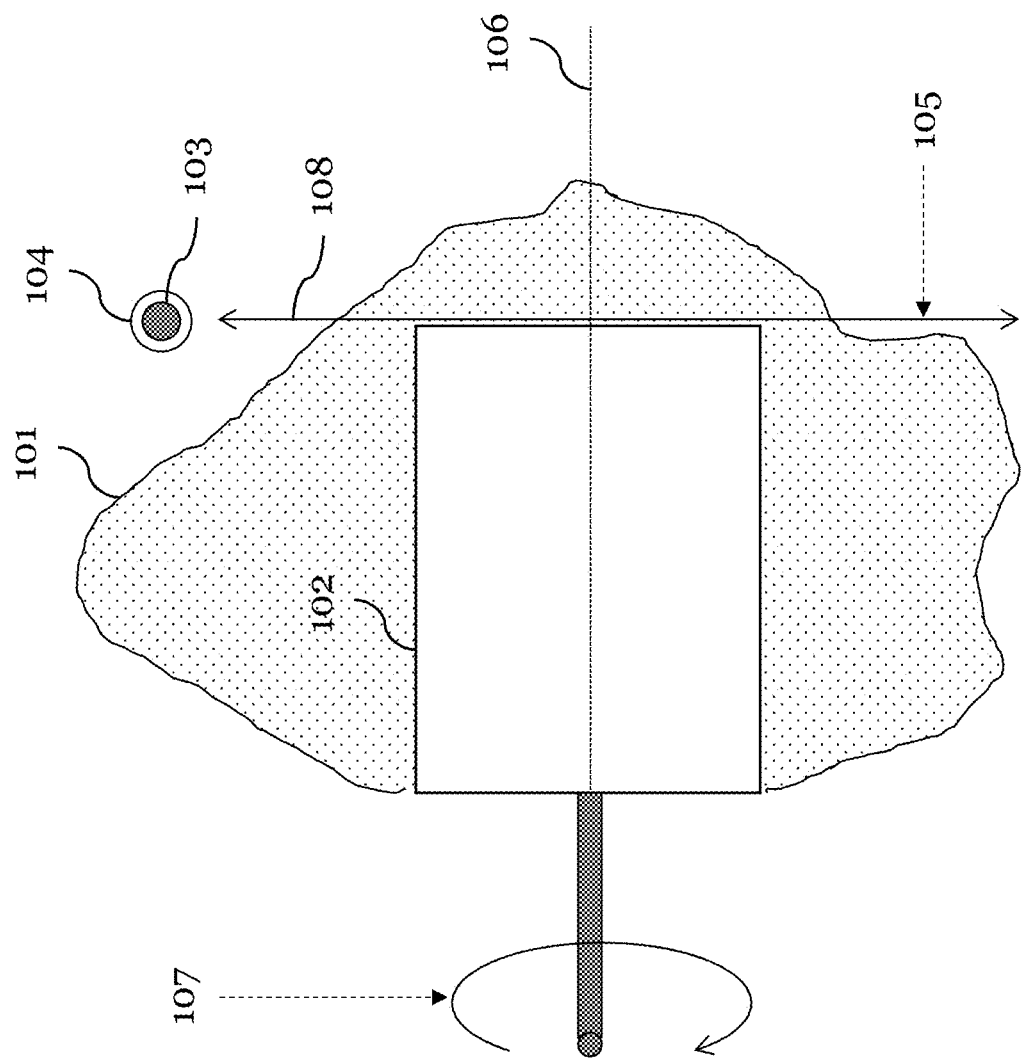
FIG. 1 shows schematically a method according to an embodiment of the invention for manufacturing a product from a workpiece.

FIG. 1 shows schematically a method 100 according to an embodiment of the invention. Steps of the method 100 are shown in a flow-diagram in FIG. 2. The method 100 is suitable for manufacturing a workpiece 101 into a product 102, by successively cutting away pieces of material from the workpiece 101. The workpiece 101 may in particular be a rough diamond (see e.g. FIG. 8), and the product 102 may in particular 102 be a brilliant (see e.g. FIG. 7) or another facetted gem. The product 102 may be planned before performing the method 100, wherein the planning may be based on the shape and volume of the workpiece 101. To manufacture the product 102, the method 100 successively cuts away pieces of material from the workpiece 101 until the desired complex product 102 shape is reached. For performing cutting, the method 100 makes use of an apparatus 300 (see FIG. 3) that provides a laser beam 103 coupled into a pressurized fluid jet 104.

In particular, the method 100 comprises a step 110 of executing multiple cuts of the workpiece 101 with the laser beam 103 according to a predetermined cut-sequence 105, in order to remove workpiece material with each completed cut. The predetermined cut-sequence 105 can be used as an input for the method 100 and/or to the apparatus 300. The method 100 further comprises a step 120 of executing multiple rotations of the workpiece 101 around the same axis of revolution 106 according to a predetermined rotation-sequence 107. The predetermined rotation-sequence 107 can be used as an input for the method 100 and/or to the apparatus 300. The predetermined cut- and rotation sequences 105 and 107 can be generated when planning the product 102 based on the workpiece 101.

In particular, a rotation is executed 120 after a completed cut. Further, for executing 110 a cut, the laser beam 103 is moved along a two-dimensional path 108 (relatively to the workpiece 101). For moving the laser beam 103, the apparatus 300 may be moved, or the workpiece 101 may be moved. A cut is completed, when a slice that was planned to be removed with this cut actually separates completely from the workpiece 101. For completing a cut, the cut (i.e. the movement of the laser beam 103 along the two-dimensional path 108 associated with it) may be executed one or more times. For instance, executing the cut once may only form a narrow groove in the workpiece 101, the groove having a certain depth. Executing the cut again may deepen the groove, and executing the cut again (and again) may extend the groove completely through and across the workpiece so that a slice falls off.

Figure 3:
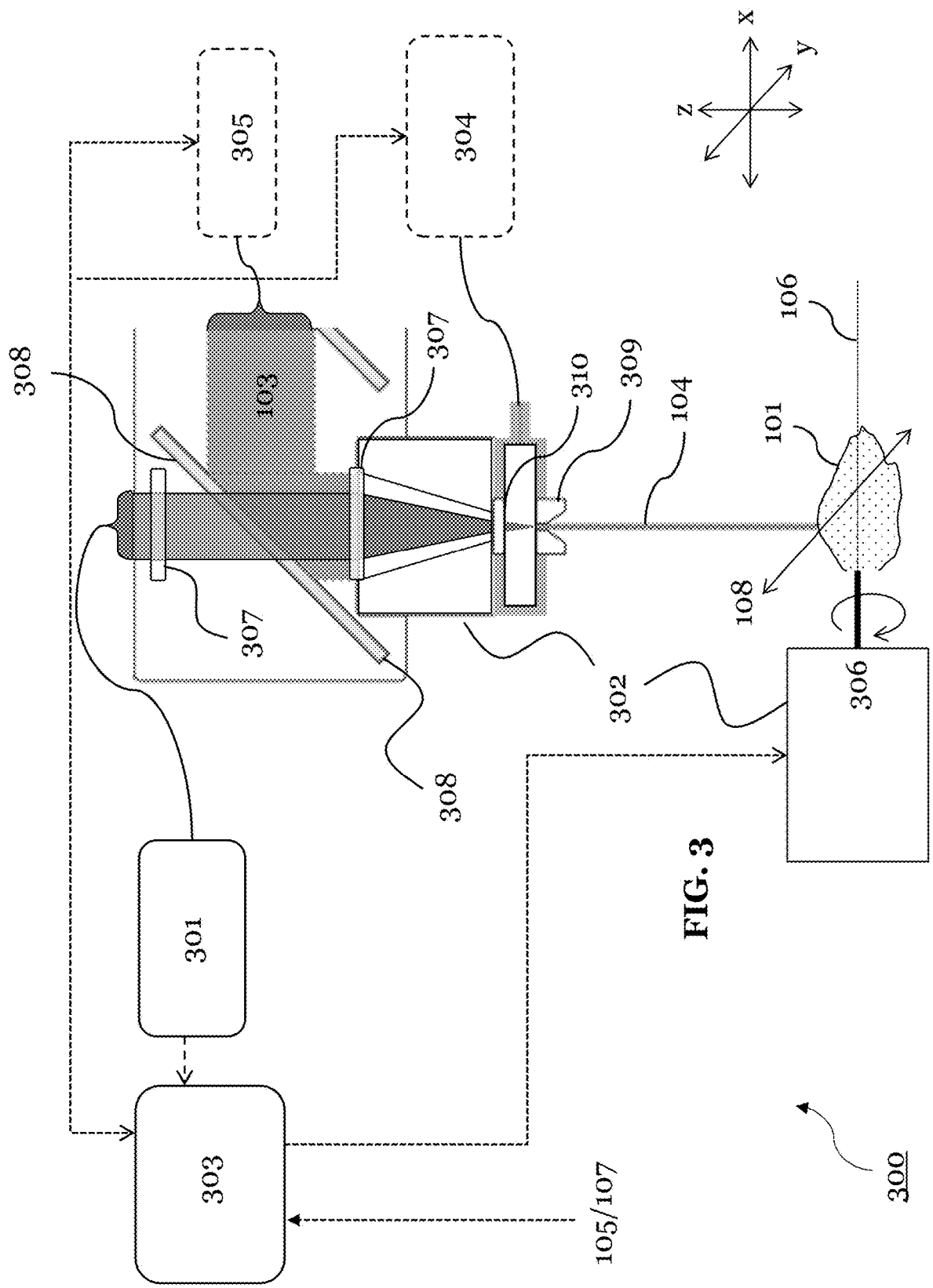
FIG. 3 shows an apparatus according to an embodiment of the invention.

FIG. 3 shows an apparatus 300 according to an embodiment of the invention. The apparatus 300 is configured to manufacture a workpiece 101 into a product 102, and may be the apparatus 300 used in the method 100. The apparatus 300 comprises at least a machining unit 302, a control unit 303, and an optical sensor 301.

The machining unit 302 is configured to provide a laser beam 103 coupled into a pressurized fluid jet 104. The control unit 303 is configured to control the machining unit 302. In particular, it may control the machining unit 302 to: execute multiple cuts of the workpiece 101 with the laser beam 103 according to a predetermined cut-sequence 105 to remove workpiece material with each completed cut, and to execute multiple rotations of the workpiece 101 around the same axis of revolution 106 according to a predetermined rotation-sequence 107. Thereby, a rotation is executed after a completed cut, and the laser beam 103 is moved for executing a cut along a two-dimensional path 108. These actions may implement the method 100 of FIG. 1 and FIG. 2. The optical sensor 301 is configured to determine at least each of the following conditions: an executed cut was completed; an executed cut was not completed. Optionally it may also determine the condition: no workpiece material was removed at all by executing a cut.

The machining unit 302 may couple the laser beam 103—e.g. received from a laser source 305, which may optionally be a part of the apparatus 300, or e.g. from multiple laser sources—into the fluid jet 104. This coupling is preferably done in the machining unit 302. During the manufacturing of the product 102, the workpiece 101 may be positioned on a machining surface, which may or may not be part of the apparatus 300. In either case, the apparatus 300 can be arranged such that it is able to machine the workpiece 101 disposed on the machining surface. The apparatus 300 may thereby control movements of the machining surface in up to three dimensions (e.g. in x-y-z as indicated in FIG. 3, wherein the z-direction is parallel to the fluid jet 104, and the x- and y-directions are perpendicular to the z-direction and to each other). The apparatus 300 is in particular able to cut the workpiece 101 by moving the fluid jet guided laser beam 103 along a cutting path, in particular a two-dimensional path 108, like a straight and/or arc, over the workpiece 101. The movement may thereby be continuous or stepwise, and a speed of the movement may be selected/changed.

The machining unit 302 may particularly include an optical element, like at least one lens 307, for coupling the laser beam 103 into the fluid jet 103. The laser beam 103 is preferably produced outside of the machining unit 302, and is injected into the machining unit 302. In the machining unit 302, a mirror or beam splitter 308 or another optical element may guide the laser beam 103 towards the at least one lens 307. The beam splitter 308 may also be used to couple part of the laser light, or electromagnetic radiation coming from the workpiece 101, to the optical sensor 301. The machining unit 302 may also include an optically transparent protection window 310, in order to separate the optical arrangement, here exemplarily the optical element 308, from the fluid circuitry and from the region of the machining unit 302 where the fluid jet 104 is produced.

For producing the fluid jet 104, the machining unit 302 may include a fluid jet generation nozzle 309 having an aperture. The fluid jet generation nozzle is preferably disposed within the machining unit 302 to produce the fluid jet 104 in a protected environment. The aperture defines the width of the fluid jet 104. The aperture may have, for example, a diameter of 10-200 µm, and the fluid jet 104 may have, for example, a diameter of about 0.6-1 times the aperture. The pressure for the pressurized fluid jet 104 is preferably provided via an external fluid supply 304, which is typically not part of the apparatus 300 (but can be). Preferably, the pressure is between 50-800 bar. For outputting the fluid jet 104 from the apparatus 300, the machining unit 302 may include an exit nozzle with an exit aperture. The exit aperture is preferably wider than the fluid nozzle aperture.

The control unit 303 may further control the at least one laser source 305 (e.g. may command a laser controller of the laser source 305). That is, the control unit 303 may instruct a laser controller of the laser source 305 to output an according laser emission. The laser controller of the laser source 305 may thereby be able set a constant or pulsed laser beam, for the latter particularly to set a pulse power, pulse width, pulse repletion rate, pulse burs rate, or a pause between pulses according to the instructions of the control unit. The control unit 303 may also control the fluid supply 304.

The workpiece 101 may be coupled with or attached to a rotatable part 306 of the apparatus 300, e.g. a rotatable part driven by a motor or CNC. For instance, the rotatable part 306 of the apparatus 300 may be a rod or a so-called "Dop". The rotatable part 306 may be at least 10% smaller, particularly at least 20% smaller (in diameter/width), than the workpiece 101 diameter. The rotatable part 306 rotates around the axis of revolution 106. The rotation of the rotatable part 306 may be controlled by the control unit 303, particularly based on an input from the optical sensor 301.

The optical sensor 301 may be arranged to receive a laser-induced electromagnetic radiation that propagates away from the workpiece 101 (while cutting the workpiece 101) through the fluid jet 104 and through at least one optical element 307, 308 towards the sensor 301. The sensor 301 may in particular be arranged to receive the laser-induced electromagnetic radiation through the fluid jet 104 and through the at least one optical element 307, which is configured to couple the laser beam 103 into the fluid jet 104. The laser-induced electromagnetic radiation may include secondary radiation emitted from a portion of the workpiece 101 that is cut with the laser beam 103. For instance, the laser-induced electromagnetic radiation may be induced because the cut surface region of the workpiece is transformed into a plasma. This plasma may emit a characteristic radiation, which can be easily isolated on or by the sensor 301. The laser-induced electromagnetic radiation may also include primary laser radiation that is reflected from the workpiece 101. The laser-induced electromagnetic radiation may also include secondary radiation generated by scattering, preferably Raman scattering, of the laser beam 103 in the fluid jet 104.

The optical sensor 301 may be arranged in the machining unit 302. However, it may also be arranged in the laser source 305. In this case, laser-induced radiation may backpropagate from the workpiece 101, and may be guided through the machining unit 302 to the laser source 305, where it is received by the sensor 301. The machining unit 302 can be optically connected to the laser source 305, for instance, by an optical fiber.

Further, the sensor 301 may be configured to convert the received radiation into a signal. The control unit 303 may include processing circuitry configured determine a state of machining the workpiece based on the signal. The state of machining the workpiece 101 may be whether the laser beam 103 has broken through the workpiece 101. The control unit 303 is in particular configured to determine whether an executed cut was completed, whether an executed cut was not completed, and/or whether no workpiece material was removed at all by executing a cut.

The apparatus 300, in particular the control unit 303, may comprise a processor or processing circuitry (not shown) configured to perform, conduct or initiate the various operations of the apparatus 300 described in this disclosure, in particular to perform the method 100. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The apparatus 300 may further comprise memory circuitry, which stores one or more instruction(s) that can be executed by the processor or by the processing circuitry, in particular under control of the software. For instance, the memory circuitry may comprise a non-transitory storage medium storing executable software code or program code, which, when executed by the processor or the processing circuitry, causes the various operations of the apparatus described in this disclosure, in particular causes the method 100 to be performed.

Figure 2:
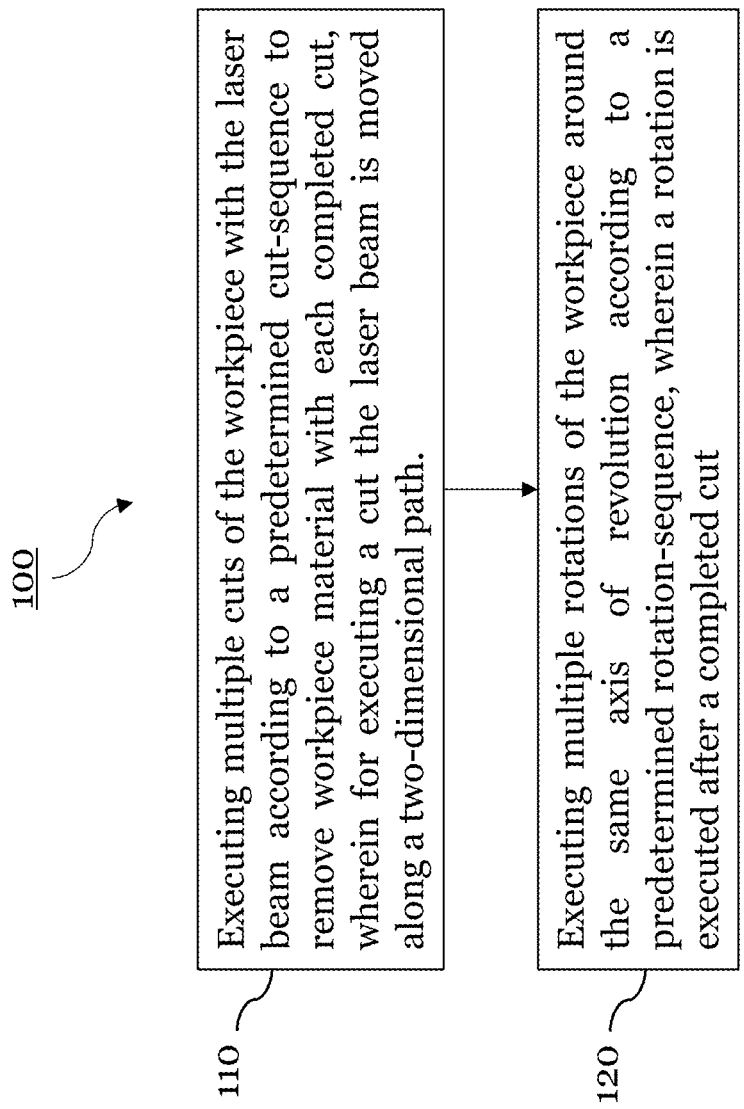
FIG. 2 shows a flow-diagram of a method according to an embodiment of the invention.
Figure 4:
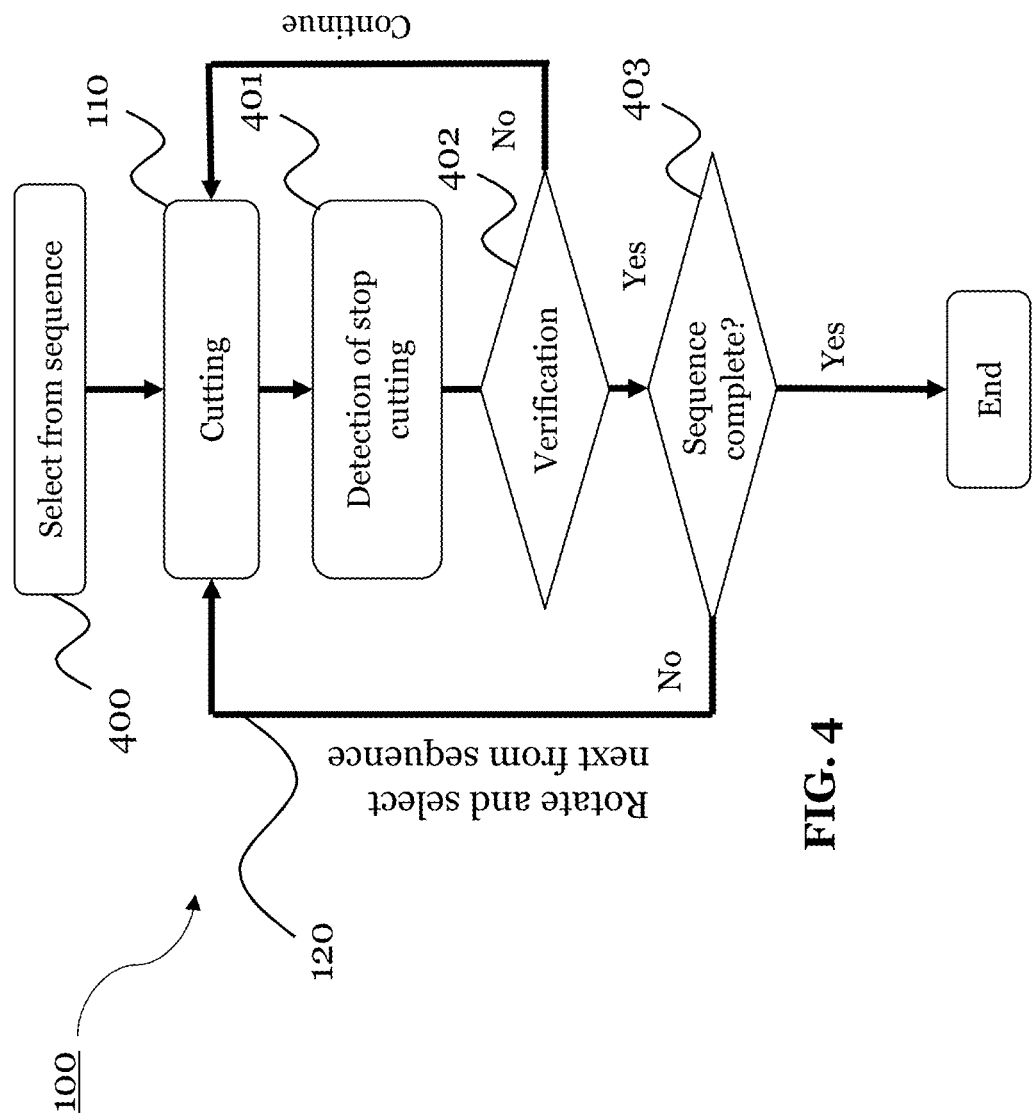
FIG. 4 shows a flow-diagram of a method according to an embodiment of the invention.

FIG. 4 shows a flow-diagram of the method 100 according to an embodiment of the invention, which builds on the method 100 shown in FIG. 1 and FIG. 2, and may be carried out by the apparatus 300. Same elements in the figures are labelled with the same reference signs and function likewise.

In the method 100 of FIG. 4, in a first step 400, a next cut to be executed is selected from the predetermined cut-sequence 105. Then the cut is executed 110 once. If it is determined 401 that the execution 110 of the cut has stopped, a verification 402 of the cut is made. That is, after the executed cut, it is verified, whether the cut was completed or not. This is done by means of the optical sensor 301 and/or the control unit 303.

Figure 5:
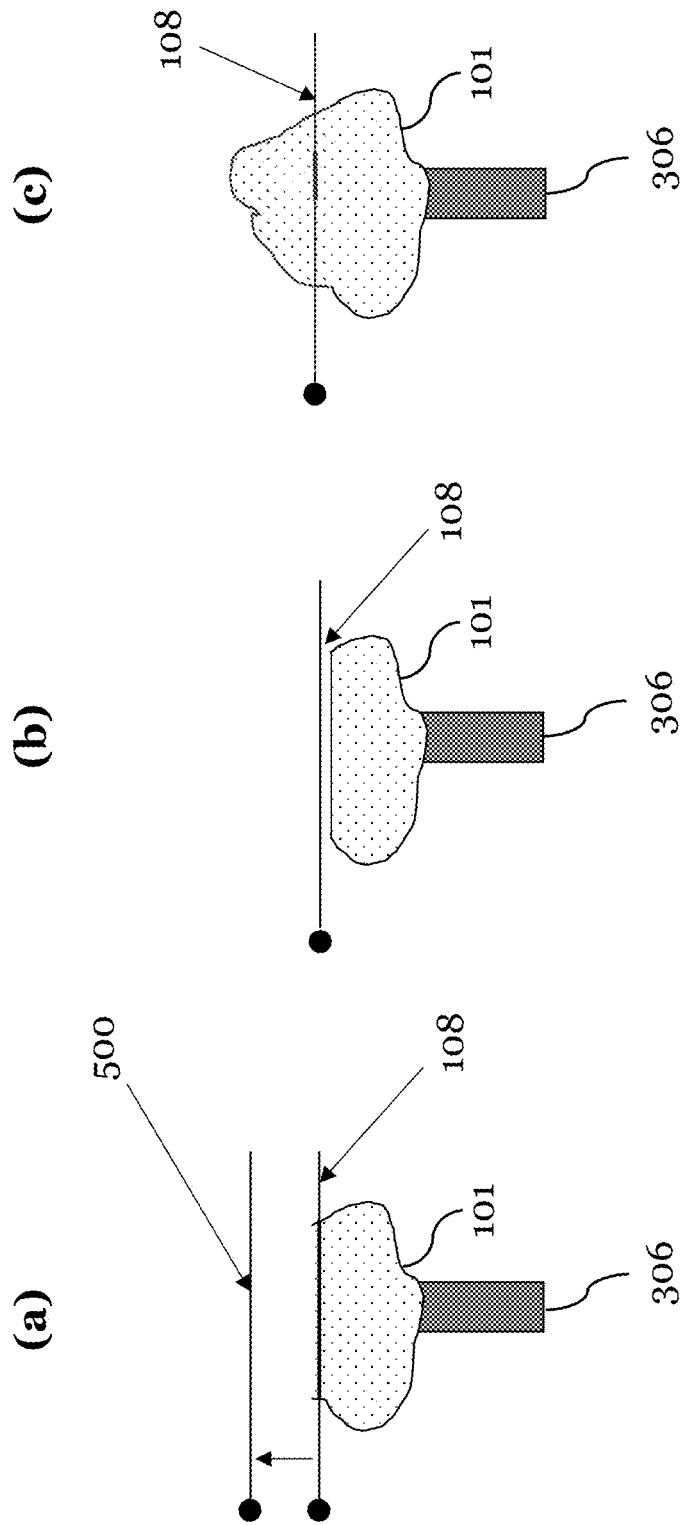
FIG. 5 shows schematically conditions detected by an optical sensor of an apparatus according to an embodiment of the invention.

The verification can determine that the cut is successfully completed, which is illustrated in FIG. 5(b), where the cut along the two-dimensional path 108 has resulted in slicing off the workpiece material as planned. In this case, the workpiece 101 can afterwards still be rotated by an angle, particularly by an angle of 180°, and then the same cut can be executed 110 again. If it is further determined that the same cut executed 100 after rotating the workpiece 101 is also completed, the method 100 may proceed. This is the 180° corrective action mentioned above.

Alternatively, as shown in FIG. 5(a) the fluid jet 104 can be moved away from the workpiece 101 to a position (e.g. within a determined verification area as indicated by the rectangular box), where material should have been removed from the workpiece 101 by completing the cut (in FIG. 5(a) it actually is sliced off). The laser beam 103 can be turned on at that position, and it can be determined (e.g. by performing a cut along a dummy path 500), whether there is still workpiece material at the determined position or not.

The verification can also determine that the cut is not successfully completed, as shown in FIG. 5(c), where the cut along the path 108 has not yet sliced off the workpiece material. In this case, the method 100 continues the cutting. That is the same cut is executed 110 again, one or multiple times, without rotating the workpiece 101 in between, if determining that the cut was not completed. This may proceed until determining that the cut is completed.

After the cut is completed, and optionally verified, the method 100 can determine whether the entire predetermined cut-sequences 105 is completed or not, i.e. whether all cuts in the cut-sequence 105 were executed and determined completed. If yes, the method 100 ends. If not, the method 100 proceeds to the next cut in the cut-sequence 105. A rotation according to the predetermined rotation-sequence 107 is executed 120 before the next cut.

Figure 6:
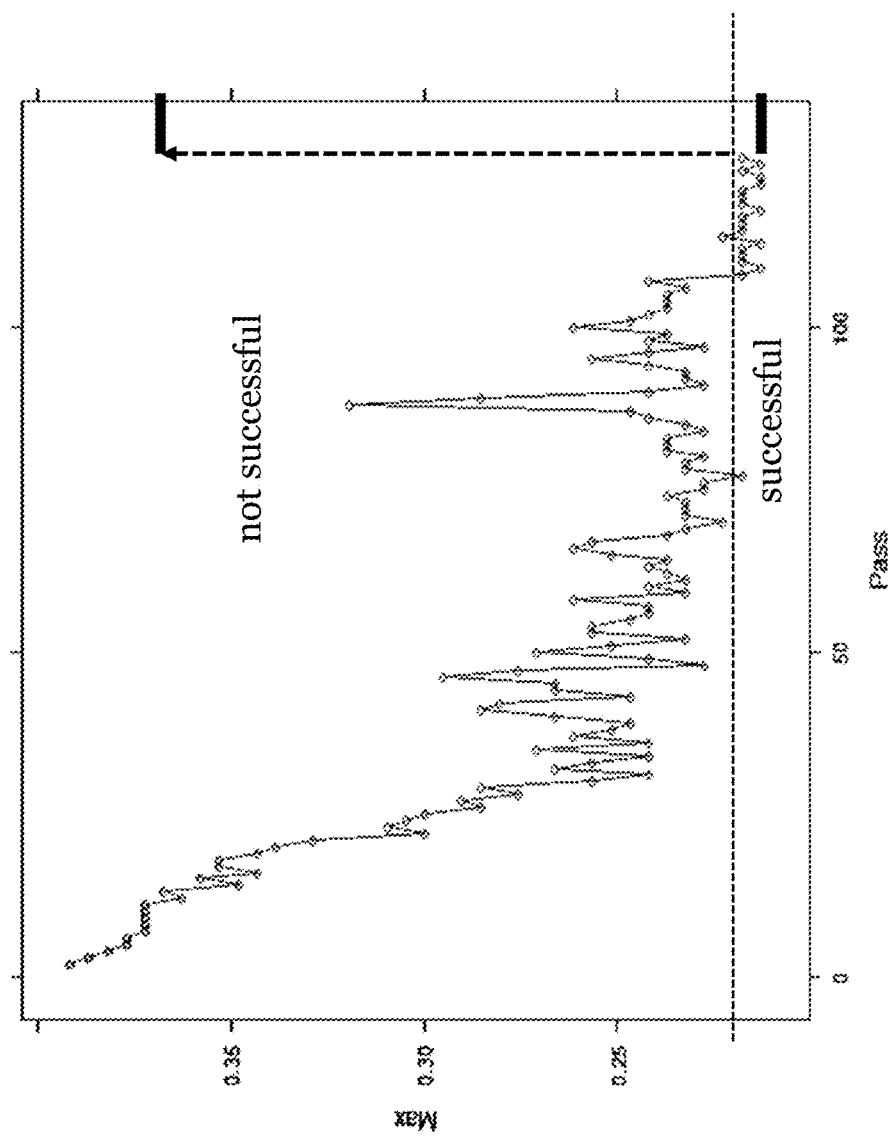
FIG. 6 shows an example of a signal of the optical sensor.

FIG. 6 shows an example of a sensor signal, which may be analyzed by the control unit 303. The control unit 303 can identify based on the sensor signal, whether an executed cut was successful (completed) or not. For instance, if the electromagnetic emission from the workpiece 101, which is induced by the laser cutting, drops below a determined threshold value, in particular for a certain amount of time, a successful cut can be determined. Above the determined threshold value, the cut may be determined not successful. If the sensor signal remains below the determined threshold value, so that the control unit 303 determines "successful", the 180° corrective action or the alternative verification area cut can be performed. If in this case the signal rises again above the determined threshold value (as indicated by the dotted arrow in FIG. 6), the initial determination of the cut being "successful" was incorrect. If, however, the signal stays below the determined threshold value, the initial determination of the cut being "successful" is confirmed.

Figure 7:
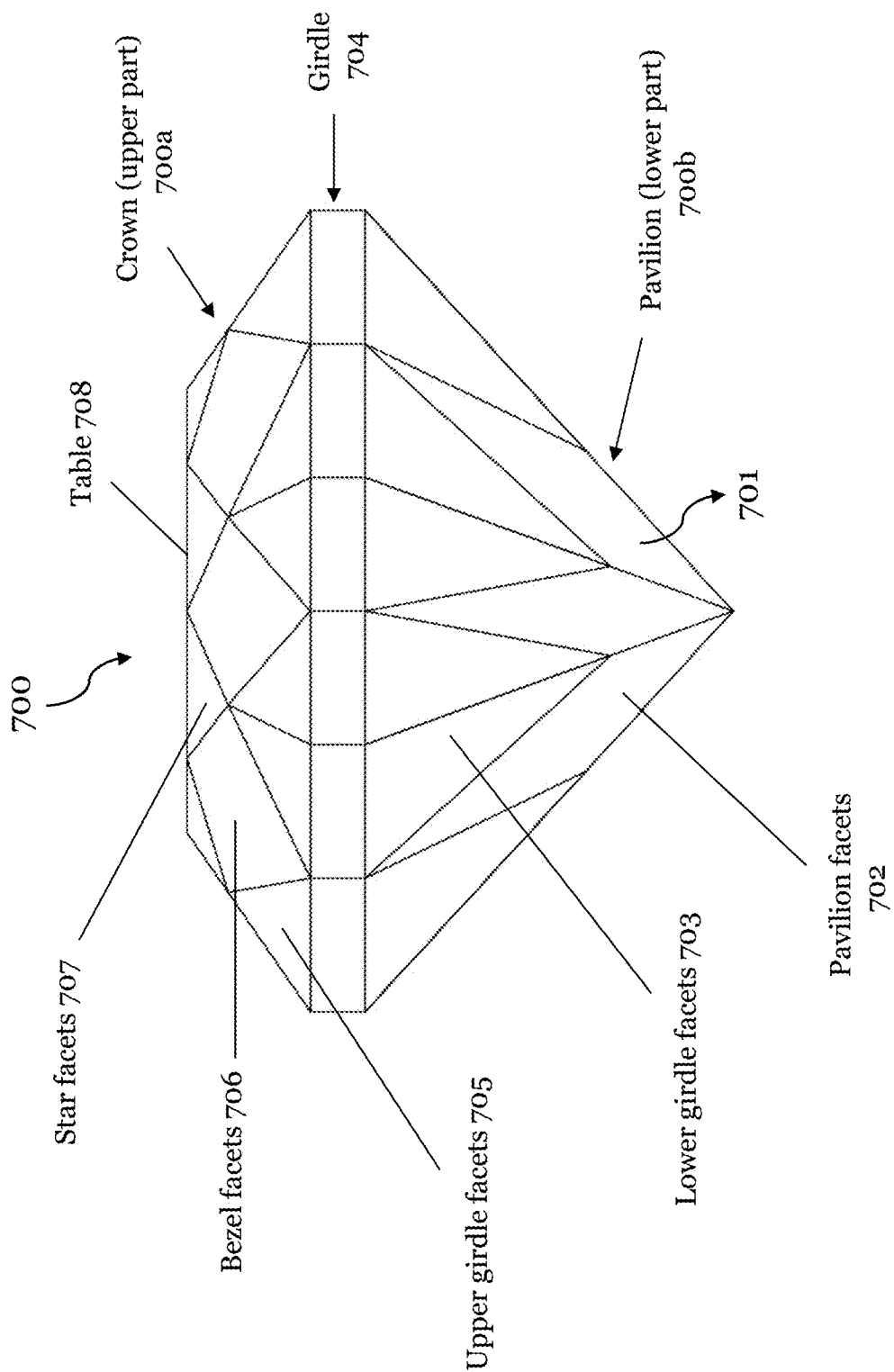
FIG. 7 shows an example of a brilliant and its facets.

As mentioned before, the method 100 and apparatus 300 are in particular suitable to manufacture a brilliant or other facetted gem. A typical brilliant 700 is shown in FIG. 7. The brilliant 700 includes a plurality of facets 701. The brilliant 700 includes an upper part 700a (the crown) and a lower part 700b (the pavilion). The parts are separated/connected by the girdle 704, which may have multiple girdle facets. The lower part 700b includes pavilion facets 702 and lower girdle facets 703. The upper part 700a includes upper girdle facets 705, bezel facets 706, and star facets 707. The brilliant 700 has also a table 708.

Figure 8:
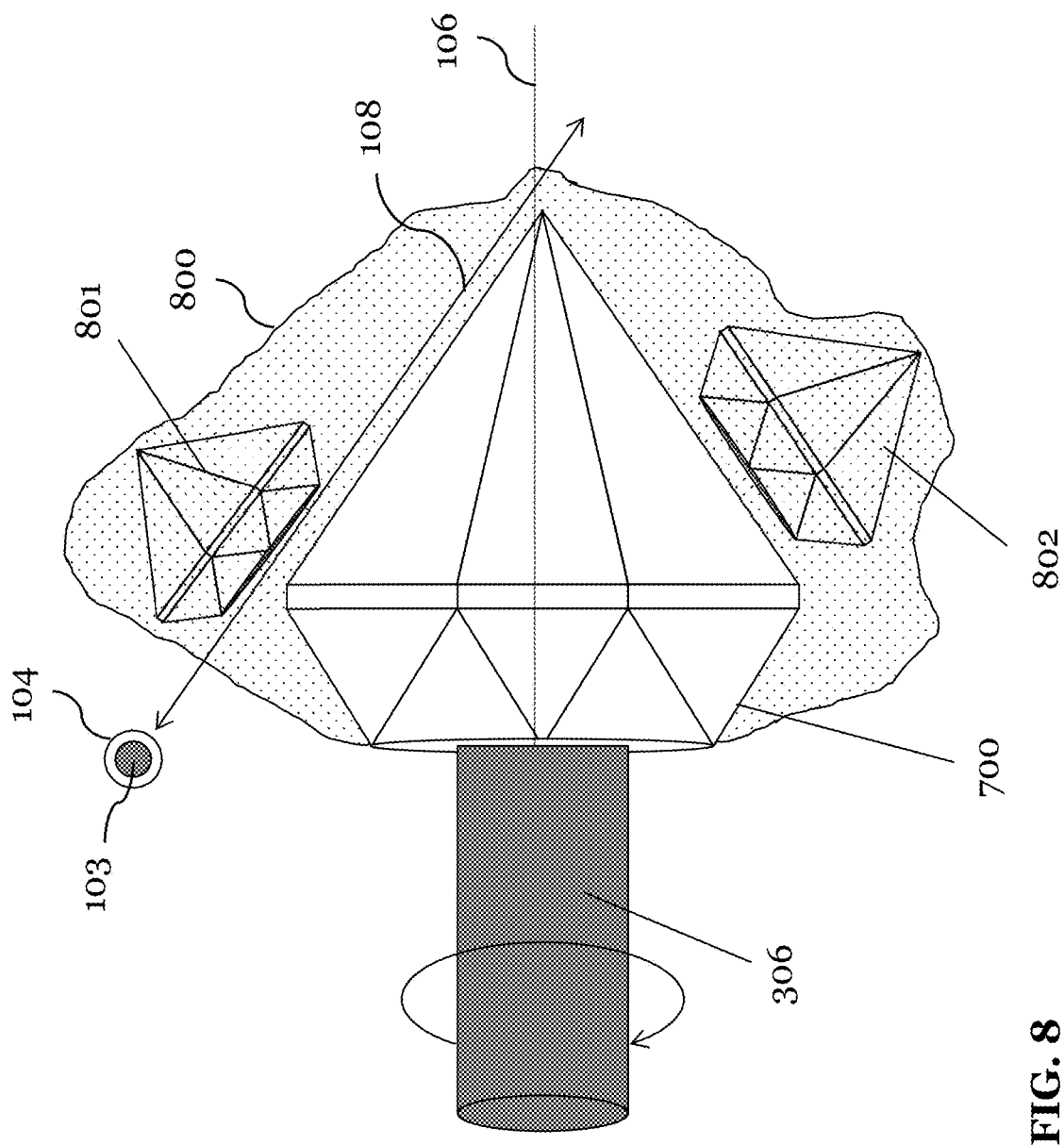
FIG. 8 shows schematically a method according to an embodiment of the invention for manufacturing a brilliant from a rough diamond.

FIG. 8 shows schematically a method 100 according to an embodiment of the invention, which builds on the method 100 shown in FIG. 1. Same elements are labelled with the same reference signs and function likewise. In FIG. 8, the workpiece 101 is a rough diamond 800, and the product 102 is a brilliant 700. The laser beam 103 and fluid jet 104 may be oriented perpendicular to the axis of revolution 106. The facets 701 of the brilliant 700 are cut by rotating around the axis of revolution 106, and moving the laser beam 103 along two-dimensional paths 108. The cutting 110 according to the predetermined cut-sequence 105 and the rotating 120 according to the predetermined rotation-sequence 107 are performed as described for the method 100 of FIG. 1 and FIG. 2. The pavilion facets 702 may be cut first, in order to remove larger pieces of rough diamond such that B-Stones 802 and C-Stones 801 can be produced from these pieces. That is, pavilion facets 702 may preferably be produced before lower girdle facets 703. Further, the girdle 704 may be cut, then bezel facets 706, then upper girdle facets 705, then star facets 707. The table 708 of the brilliant 700 is preferably pre-produced, so that the rough diamond 800 can be attached with the table 708 to the rotating part 306 of the apparatus. The configuration shown in FIG. 8 is suitable for the "side-on" cutting strategy.

Figure 9:
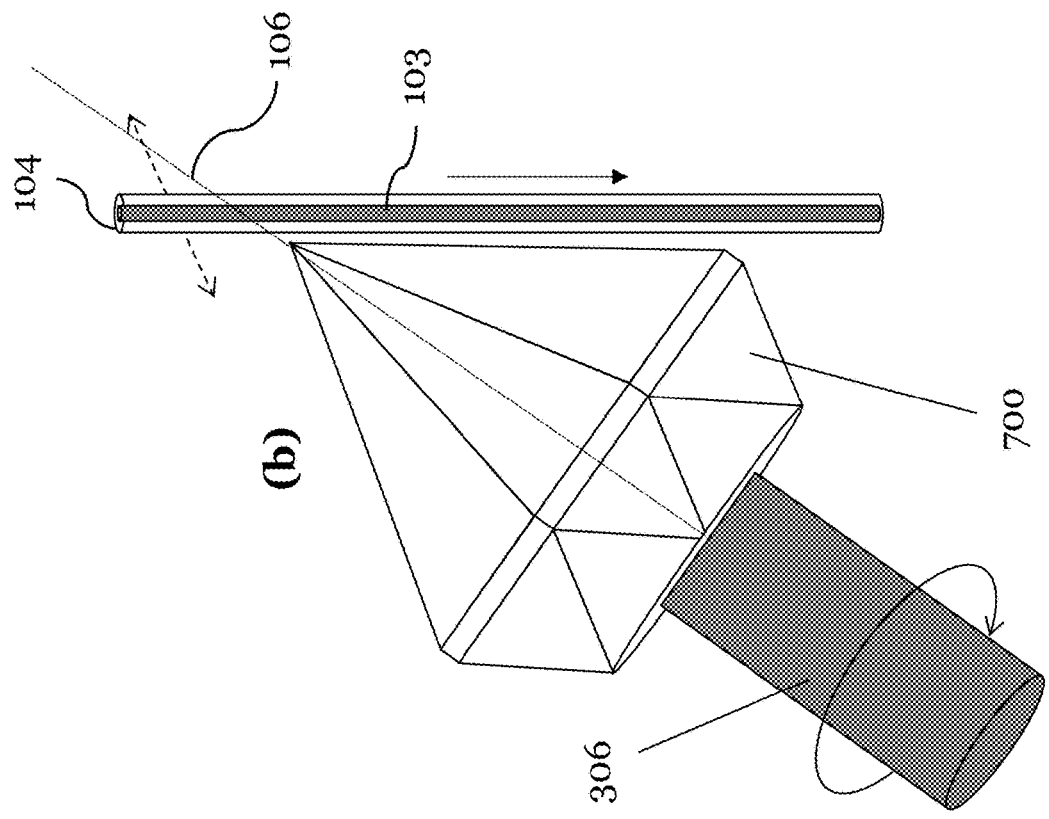
FIG. 9 shows schematically methods according to embodiments of the invention for manufacturing a brilliant from a rough diamond.
Figure 9:
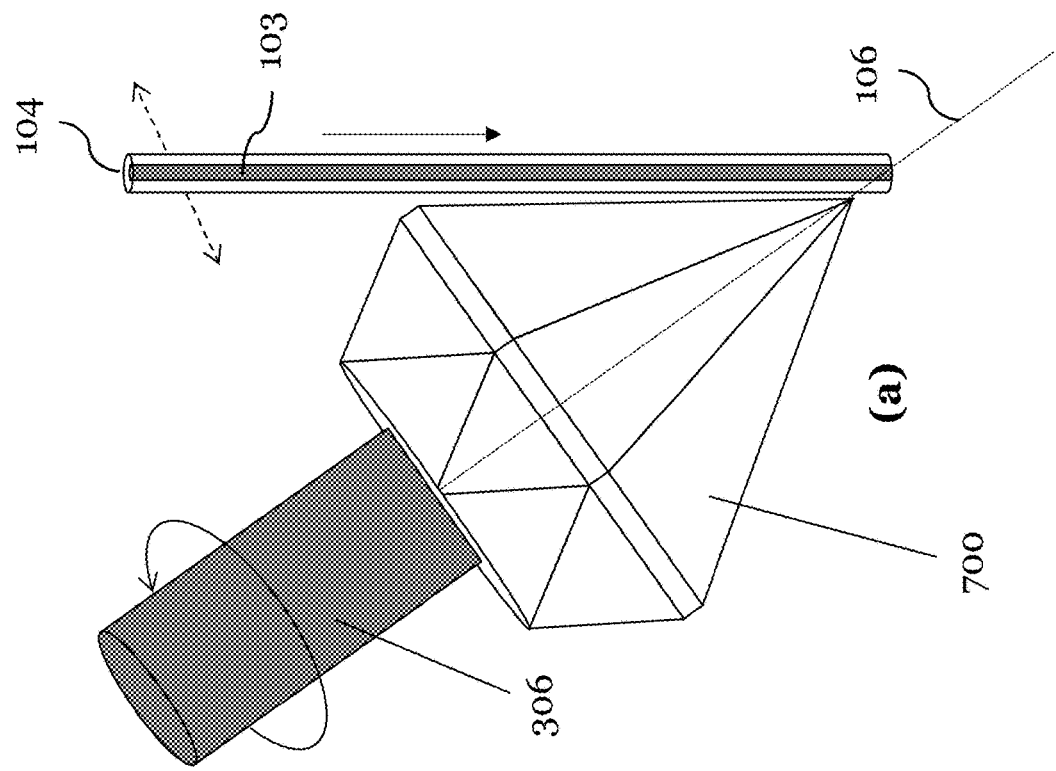

FIG. 9 shows that the axis of revolution 106 can also be non-perpendicular to the laser beam 103 and fluid jet 104, respectively, i.e. they can be aligned oblique to another. FIG. 9(a) shows that in this case a table 708 of the brilliant 700 may be oriented towards the apparatus 300 (the laser beam 103 comes from above, as indicated by the arrow), while FIG. 9(b) shows that also a culet or tip of the brilliant may be oriented towards the apparatus 300. The configurations shown in FIG. 9 are suitable for the "end-on" cutting strategy, particularly for the "culet-up" or "table-up" cutting strategies.

Figure 10:
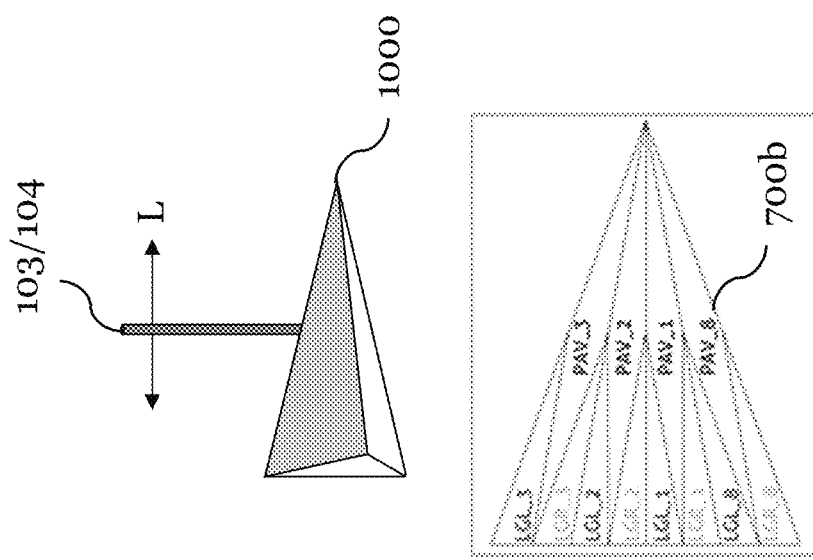
FIG. 10 shows a "side-on" cutting strategy implemented with a method according to an embodiment of the invention.
Figure 11:
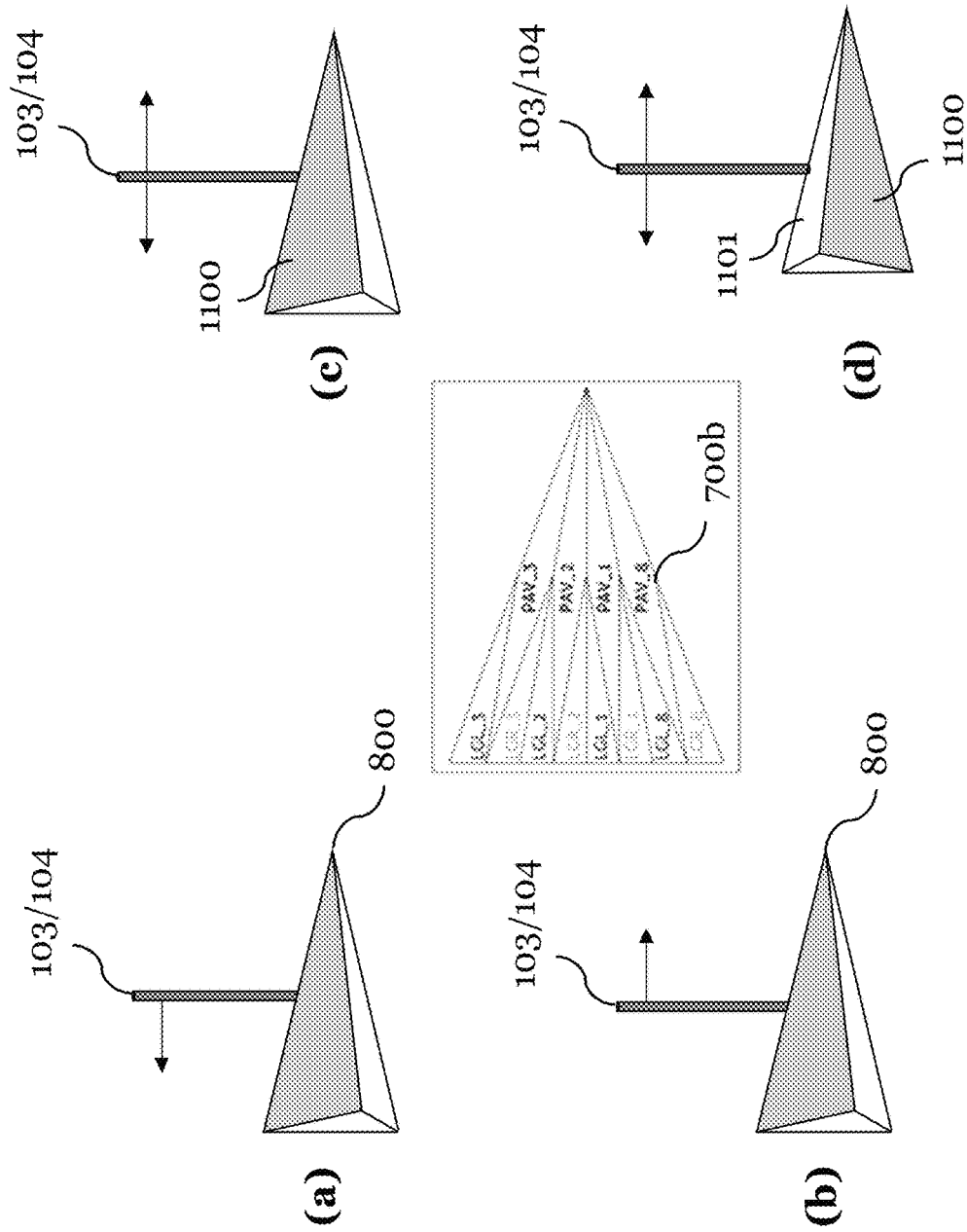
FIG. 11 shows in (a) and (b) "one-direction" cutting strategies, shows in (c) a "grouped-fresh" cutting strategy, and shows in (d) a "grouped-rough" cutting strategy implemented with a method according to an embodiment of the invention
Figure 12:
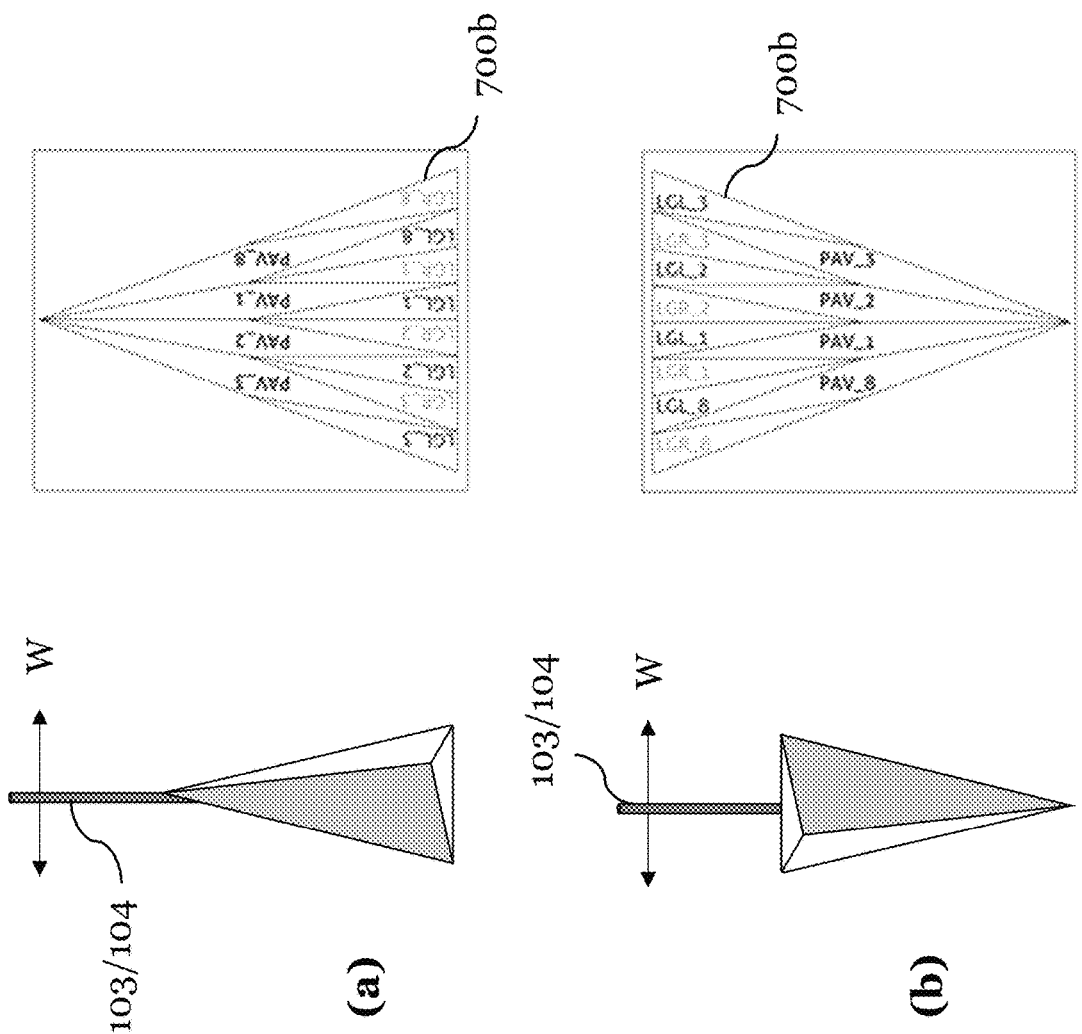
FIG. 12 shows in (a) and (b) "end-on" cutting strategies implemented with a method according to an embodiment of the invention.

The different cutting strategies proposed in this document are respectively illustrated in FIGS. 10, 11 and 12. FIG. 10 shows a "side-on" cutting strategy. FIG. 12 shows "end-on" cutting strategies, particularly "culet-up" in FIG. 12(a) and "table-up" in FIG. 12(b). FIGS. 11 (a) and (b) shows "one-direction" cutting strategies, particularly in combination with the "side-on" cutting strategy, i.e. "uphill" in FIG. 11(a) and "downhill" in FIG. 11(b). Notably, a "one-direction" cutting strategy can also be combined with an "end-on" cutting strategy. FIGS. 11 (c) and (d) show "grouped fresh" and "grouped-rough" cutting strategies, respectively, particularly in combination with the "side-on" cutting strategy. Notably, a "grouped" cutting strategy can also be combined with an "end-on" cutting strategy.

A preferred cutting strategy combination for cutting a brilliant 700 from a diamond 800 combines "side-on", "back-and-forth" and "grouped-fresh".

In particular, it can be seen in FIG. 10 that "side-on" means that the laser beam 103 is always moved along the length L of the facet 701 to be produced, in order to execute 110 a cut. That is, towards and/or away from an apex 1000 of the brilliant facet 701. FIG. 10 particularly shows "side-on" in combination with the "back-and-forth" cutting strategy, according to which the laser beam 103 is moved along the two-dimensional path 108 back and forth (i.e. in both ways), in order to execute 110 a cut multiple times. FIG. 10 also illustrates, by showing the orientation of the pavilion 700b of the brilliant, that along the length means in a direction from culet to table 708 or vice versa.

FIGS. 11(a) and (b) show "one direction" cutting strategies, according to which the laser beam 103 is moved along the two-dimensional path 108 always in the same direction, in order to execute 110 a cut multiple times. In FIG. 11(a) the strategy is "uphill", i.e. the laser beam 103 is always moved away from apex 1000 of the facet 701 (towards its base) to execute 110 a cut, while FIG. 11(b) shows "downhill", i.e. the laser beam 103 is always moved towards the apex 1000 of the facet 701 (away from its base) to execute 110 a cut.

FIGS. 11(c) and (d) show "grouped" cutting strategies, in which a first group of discontiguous lower girdle facets 703, particularly left lower girdle facets 703 or right lower girdle facets 703, is produced before a second group of discontiguous lower girdle facets 703, particularly right lower girdle facets 703 or left lower girdle facets 703, respectively, is produced. FIG. 11(c) shows the "grouped fresh" strategy, according to which the laser beam 103 is positioned on a previously produced (fresh) facet 1100 to execute 110 a cut. FIG. 11(d) shows the "grouped rough" strategy, according to which the laser beam 103 is positioned on an uncut surface 1101 of the rough diamond 700 to execute 110 a cut.

FIGS. 12 (a) and (b) show "end-on" strategies, according to which the laser beam 103 is always moved along the width W of the facet 701 to execute 110 a cut. Width may be perpendicular to length L shown in FIG. 10. FIG. 12(a) shows a "culet-up" strategy, according to which a culet faces (is oriented towards) the apparatus 300 (see FIG. 9b). FIG. 12(b) shows a "table-up" strategy, according to which a table faces (is oriented towards) the apparatus 300 (see FIG. 9a). FIG. 12 also illustrates, by showing the orientation of the pavilion 700b of the brilliant 700, that along the width means e.g. in a direction parallel the girdle 704.

The present invention has been described in conjunction with various embodiments as examples as well as implementation forms. However, other variations can be understood and effected by those persons skilled in the art and practicing the claimed invention, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. Method (100) for manufacturing a workpiece (101) into a product (102), wherein the method (100) is performed by an apparatus (300) providing a laser beam (103) coupled into a pressurized fluid jet (104) and guided in the fluid jet by internal reflection, the method (100) comprising:
   executing (110) multiple cuts of the workpiece (101) with the laser beam (103) according to a predetermined cut-sequence (105) to remove workpiece material with each completed cut, and determining after each executed cut, with an optical sensor (301) of the apparatus (300), whether the cut was completed or not,
   executing (120) multiple rotations of the workpiece (101) around a same axis of revolution (106) according to a predetermined rotation-sequence (107),
   wherein a rotation is executed (120) after a completed cut, and
   wherein for executing (110) a cut the laser beam (103) is moved along a two-dimensional path (108),
   rotating the workpiece (101), and then executing (110) the same cut again to ensure that the cut is completed, if determining with the sensor that the cut was completed, and
   executing (110) the next cut according to the predetermined cut-sequence (105) if further determining that also the same executed cut after rotating the workpiece (101) was completed,
   wherein the workpiece (101) is a rough diamond (800), the product (102) is a brilliant (700) with a plurality of facets (701), and each particular facet (701) of the plurality of facets (701) is produced by executing (110) a cut one or multiple times until the cut is completed.

2. Method (100) according to claim 1, wherein:
   one rotation by an angle determined from the predetermined rotation-sequence (107) is executed (120) after each completed cut, and
   the laser beam (103) is moved once along a two-dimensional path (108) determined from the predetermined cut-sequence (105) for executing (110) a cut.

3. Method (100) according to claim 1, further comprising:
   moving, if determining that the cut was completed, the fluid jet (104) away from the workpiece (101) to a determined position where material should have been removed from the workpiece by completing the cut,
   turning on the laser beam at the determined position, and
   determining, with the optical sensor, whether there is workpiece material at the determined position or not.

4. Method (100) according to claim 1, further comprising:
   executing (110) the same cut again one or multiple times without rotating the workpiece (101), if determining that the cut was not completed, until determining that the cut was completed.

5. Method (100) according to claim 1, wherein, for producing the particular facet (701):
   the laser beam (103) is always moved along a length of the facet (701) to execute (110) the cut.

6. Method (100) according to claim 1, wherein:
   the axis of revolution (106) is perpendicular to the pressurized fluid jet (104) and the laser beam (103).

7. Method (100) according to claim 1, wherein, for producing the particular facet:
   the laser beam (103) is always moved along a width of the facet (701) to execute (110) the cut.

8. Method (100) according to claim 1, wherein:
   the axis of revolution (106) is non-perpendicular to the pressurized fluid jet (104) and the laser beam (103).

9. Method (100) according to claim 1, wherein, for producing the particular facet (701):
   the laser beam (103) is moved along the two-dimensional path (108) back and forth, in order to execute (110) the cut multiple times.

10. Method (100) according to claim 1, wherein, for producing the particular facet (701):
    the laser beam (103) is moved along the two-dimensional path (108) always in a same direction, in order to execute (110) the cut multiple times.

11. Method (100) according to claim 10, wherein, for producing the particular facet (701):
    the laser beam (103) is always moved towards an apex (1000) of the facet (701) to execute (110) the cut, or
    the laser beam (103) is always moved away from the apex (1000) of the facet (701) to execute (110) the cut.

12. Method (100) according to claim 1, wherein, for producing the particular facet (701):
    the laser beam (103) is positioned on a previously produced facet (1100) to execute (110) the cut.

13. Method (100) according to claim 1, wherein, for producing the particular facet (701):
    the laser beam (103) is positioned on an uncut surface (1101) of the rough diamond (800) to execute (110) the cut.

14. Method (100) according to claim 1, wherein:
    the plurality of facets (701) is produced according to an order of appearance.

15. Method (100) according to claim 14, wherein:
    pavilion facets (702) are produced before lower girdle facets (703).

16. Method (100) according to claim 15, wherein:
    a first group of discontiguous lower girdle facets (703), is produced before a second group of discontiguous lower girdle facets (703) is produced.

17. Method (100) according to claim 15, wherein:
    before creating a lower girdle facet (703) and/or an upper girdle facet (705), the rough diamond (800) is rotated such that the cut is executed (110) from the side offering the larger cutting angle.

18. Method (100) according to claim 1, wherein:
    57 facets (701) of the brilliant (700) are created by automatically cutting the rough diamond (800) according to the cut-sequence (105) and the rotation-sequence (107) using the fluid-jet guided laser beam (103, 104) and the optical sensor (301) of the apparatus (300).

19. Apparatus (300) for manufacturing a workpiece (101) into a product (102), the apparatus (300) comprising:
    a machining unit (302) configured to provide a laser beam (103) coupled into a pressurized fluid jet (104) and guided in the fluid jet by internal reflection,
    a control unit (303) configured to control the machining unit (302) to:
      execute multiple cuts of the workpiece (101) with the laser beam (103) according to a predetermined cut-sequence (105) to remove workpiece material with each completed cut,
      execute multiple rotations of the workpiece (101) around a same axis of revolution (106) according to a predetermined rotation-sequence (107),
      wherein a rotation is executed after a completed cut,
      wherein the laser beam (103) is moved for executing a cut along a two-dimensional path (108), rotate the workpiece (101), and then execute (110) the same cut again to ensure that the cut is completed, if determining with the sensor that the cut was completed, and execute (110) the next cut according to the predetermined cut-sequence (105), if further determining that also the same executed cut after rotating the workpiece (101) was completed, and an optical sensor (301) configured to determine either an executed cut was completed or an executed cut was not completed; and wherein the workpiece (101) is a rough diamond (800), the product (102) is a brilliant (700) with a plurality of facets (701), and the apparatus is configured to produce each particular facet (701) of the plurality of facets (701) by executing (110) a cut one of multiple times until the cut is completed.

20. Computer program comprising a program code for performing the method according to claim 1, when executed on a computer and/or for controlling an apparatus for manufacturing the workpiece (101) into the product (102).

* * * * *